(12) United States Patent
Beyrle

(10) Patent No.: US 7,056,380 B2
(45) Date of Patent: Jun. 6, 2006

(54) AQUEOUS BLACK ENAMEL COMPOSITION FOR GLASS SUBSTRATE

(75) Inventor: Andre Beyrle, Tracy le Val (FR)

(73) Assignee: Saint-Gobain Glass France, Courbevoie (FR)

( * ) Notice: Subject to any disclaimer, the term of this patent is extended or adjusted under 35 U.S.C. 154(b) by 132 days.

(21) Appl. No.: 10/297,493

(22) PCT Filed: Jun. 6, 2001

(86) PCT No.: PCT/FR01/01736

§ 371 (c)(1),
(2), (4) Date: May 5, 2003

(87) PCT Pub. No.: WO01/94269

PCT Pub. Date: Dec. 13, 2001

(65) Prior Publication Data

US 2003/0186799 A1 Oct. 2, 2003

(30) Foreign Application Priority Data

Jun. 9, 2000 (FR) .................................. 00 07409

(51) Int. Cl.
*C03C 8/00* (2006.01)
(52) U.S. Cl. ................ 106/600; 106/635; 106/425; 106/431; 106/286.2; 428/428; 428/432
(58) Field of Classification Search ............... 106/600, 106/38.3, 38.9, 425, 431, 635, 286.2; 428/357, 428/426, 428, 432, 913
See application file for complete search history.

(56) References Cited

U.S. PATENT DOCUMENTS

| | | | |
|---|---|---|---|
| 3,883,339 A * | 5/1975 | Michalik et al. ............... 65/114 |
| 4,486,213 A | 12/1984 | Lentz et al. | |
| 5,518,535 A * | 5/1996 | Boaz ......................... 106/38.3 |
| 5,698,025 A | 12/1997 | Boaz | |
| 5,925,160 A * | 7/1999 | Sakoske ..................... 65/60.5 |
| 5,938,834 A * | 8/1999 | Boaz .......................... 106/600 |
| 6,126,737 A * | 10/2000 | Mason ....................... 106/600 |
| 6,261,693 B1 * | 7/2001 | Veerasamy ................. 428/408 |

FOREIGN PATENT DOCUMENTS

| | | |
|---|---|---|
| EP | 0 658 522 | 6/1995 |
| FR | 1 019 192 | 1/1953 |
| FR | 2 179 526 | 11/1973 |
| SU | 773 031 | 10/1980 |
| WO | WO 96/21629 | 7/1996 |

OTHER PUBLICATIONS

Dictionary of Glass-Making—Dictionnaire De Verrerie Glas-Fachwoerterbuch, c/o Instuitut National De Verre, Charleroi, Belgium, p. 136, Ref. No. 3507, 1965.

* cited by examiner

*Primary Examiner*—David Sample
(74) *Attorney, Agent, or Firm*—Oblon, Spivak, McClelland, Maier & Neustadt, P.C.

(57) ABSTRACT

A water-based black enamel composition capable of being deposited on a glass substrate, especially on a glass sheet. The enamel composition includes: 20 to 40% by weight of water-soluble sodium silicate and/or potassium silicate; a water-soluble base, in an amount sufficient for the pH of the composition to be at least 10.5; 5 to 25% by weight of water; 40 to 60% by weight of a metal oxide chosen from the group consisting of copper oxides, iron oxides, cobalt oxides, mixtures of these oxides, and mixtures of at least one of the oxides with chromium oxide(s); less than 10% by weight of zinc oxide; at least 10% by weight of a glass frit having a melting point below 680° C.; and less than 10% by weight of a glass frit having a Littleton point above 700° C. A glazing, especially an automobile glazing, including at least one glass sheet can have at least one of the faces of the glass sheet coated at least partially with the enamel composition.

38 Claims, No Drawings

AQUEOUS BLACK ENAMEL COMPOSITION FOR GLASS SUBSTRATE

The invention relates to a water-based black enamel composition which can be deposited on a glass substrate and to the resulting enameled substrates, particularly enameled glazing.

It is known to use enamel compositions on glass substrates, especially glazing for automobiles or buildings, in order to form deposits of all kinds, for example decorative, conductive or protective layers or layers intended to form masks.

These enamel compositions serve especially to form the opaque peripheral band, of dark color, generally solid but possibly also including apertures, which is found on windshields, side windows and rear windows of motor vehicles. The function of the band is twofold. Firstly, it allows the integrity of the adhesive lying under the glazing to be preserved, when the glazing is mounted in the body opening by bonding, forming a screen against solar radiation, more particularly ultraviolet radiation. Secondly, it improves the external appearance of the vehicle by masking the electrical or other connection elements located around the border of the internal face of the glazing, as is especially the case for rear windows.

In general, the enamel compositions useful for forming such a band are formed from a powder comprising a glass frit (which has to form the glassy matrix) and pigments (especially as gray or black colorants, these pigments possibly forming part of the frit) and from a medium. The pigments are most often metal oxides, such as chromium, cobalt, nickel and iron oxides, which do not react with the other constituents of the composition. The medium ensures that the solid particles are in correct suspension and allows application and temporary adhesion of the enamel to the substrate. In general, the medium contains organic solvents, such as pine oil or terpenes, mineral oils, diluents and/or resins, or UV-crosslinkable components.

The enamel composition is generally deposited on the surface of the glass substrate by screen printing, spraying, curtain coating or roll coating, and then it is fixed to the glass. The fixing operation is necessary in order to allow the substrate to be handled, for example for the purpose of bending it and/or toughening it, without any risk of damaging the enamel layer. Depending on the medium used, the fixing may consist of a drying operation, for example carried out by simply heating to a moderate temperature (of around 80–150° C.) so as to remove the organic solvent(s), or of a UV curing operation when the medium is crosslinkable.

One of the problems with the existing enamel compositions is the presence of solvents, especially organic solvents. Because of the toxicity of some of them with which users come into contact, and also because of their possible environmental risks, attempts have been made to replace them with water.

Water-based enamel compositions are known, which contain a water-soluble sodium silicate, a water-soluble base, a metal oxide powder and a glass frit having a melting point below 1 300° F. (=704° C.) (U.S. Pat. No. 5,518,535) and also zinc oxide (U.S. Pat. No. 5,698,026) or glass particles having a melting point above 1 700° F. (=926° C.) (U.S. Pat. No. 5,677,064).

However, the abovementioned water-based compositions have drawbacks. With such compositions, it is difficult to obtain a coating having a fusibility compatible with the temperature conditions applied during the forming of laminated glazing. This is because, at the applied temperature, which in general does not exceed 650° C. (the temperature of the glass), the enamel has a tendency to exhibit a residual capillary effect because of insufficient sintering. Moreover, the enamel obtained under the bending conditions does not have the expected properties in terms of color. On clear (untinted) glass, the enamel formed has a somewhat intense gray tint, this tint being furthermore chromatically non-neutral. Depending on the type of pigment(s) used, the absence of chromatic neutrality results in a gray coloration tending toward red, green, blue or yellow. Finally, although it is possible on tinted glass to obtain a black enamel, this coloration does not have the desired "intensity" (or "depth"); in particular, it has an $L^*$ value substantially greater than that defined later in the text.

The present invention provides a novel water-based enamel composition which allows the aforementioned drawbacks to be remedied. The composition according to the invention can be deposited on a glass substrate, exhibits excellent bonding to the glass after drying (and consequently excellent scratch resistance), is antisticking at the bending temperatures and makes it possible to obtain, after baking, a black enamel forming a uniform coating of good durability.

Another subject of the invention is an enamel composition that can be deposited on a clear glass substrate in order to form a chromatically neutral black enamel, this composition furthermore having the advantages of the composition defined in the previous paragraph.

Another subject of the invention is glass substrates coated with the aforementioned enamel compositions, especially enameled glazing, particularly laminated glazing for automobiles.

In the present invention, the term "enamel composition" is understood to mean the enamel composition in question before it has been baked, the enamel after baking being essentially in the form of a colored glassy matrix.

The term "black enamel" is understood according to the invention to mean an enamel which, after baking, has an $L^*$ value of less than or equal to 8, preferably less than or equal to 6.

The expression "chromatically neutral black enamel" is understood according to the invention to mean an enamel which, after baking, has the following colorimetric coordinates, in absolute values:

$L^* \leq 8$; $|a^*| \leq 1$ and $|b^*| \leq 1$ and preferably $L^* \leq 6$; $|a^*| \leq 0.6$ and $|b^*| \leq 0.6$.

The colorimetric coordinates $L^*$, $a^*$ and $b^*$ were defined and proposed in 1931 by the CIE (Commission Internationale de l'Eclairage [*International Illumination Commission*]) and have formed the subject of an official CIE recommendation in 1976 (International Illumination Commission, Colorimetry—Official Recommendations—CIE Publication No. 15-2, Vienna, 1986). The abovementioned colorimetric coordinates are measured in reflection, using a Minolta CM 2002 spectrocolorimeter, under illuminant $D_{65}$ and at an angle of observation of 10° and in specular excluded mode.

The term "clear glass" is understood here to mean a glass whose light transmission factor $T_L$ under illuminant $D_{65}$ is greater than or equal to 90%, measured on a glass sheet 4 mm in thickness with parallel faces.

According to the invention, the water-based black enamel composition capable of being deposited on a glass substrate, especially on glazing, comprises:

20 to 40% by weight of water-soluble sodium silicate and/or potassium silicate;

a water-soluble base, in an amount sufficient for the pH of the composition to be at least 10.5;

5 to 25% by weight of water;
40 to 60% by weight of a metal oxide chosen from the group consisting of copper oxides, iron oxides, cobalt oxides, mixtures of these oxides and mixtures of at least one of said oxides with chromium oxide(s);
less than 10% by weight of zinc oxide;
at least 10% by weight of a glass frit having a melting point below 680° C.; and
less than 10% by weight of a glass frit having a Littleton point above 700° C.

In the present invention, the term "melting point" has the meaning commonly accepted in the enamel field, i.e. it denotes the temperature at which a glass frit is sufficiently molten to bond to the glass on which it has been deposited and form an impermeable vitreous layer. This "melting point" is also called the "baking temperature" or "fusing temperature". It corresponds to the minimum temperature at which the frit exhibits "sufficient" sintering, this "sufficient" sintering being manifested by the disappearance of the capillary effect. In practice, this consists for a person skilled in the art in determining the temperature at which a frit deposited on a glass substrate must be baked in order to form a layer having a porosity such that a liquid cannot pass through it. Hereafter, the expression "glass frit having a melting point below 680° C." will be called "low-melting-point frit".

Also according to the invention, the term "Littleton point" or "(Littleton) softening point" has the meaning recognized in the glass field. The "Littleton point" corresponds to the temperature of a glass having a viscosity of $10^{7.6}$ poise, measured under standardized conditions (ASTM C 338). Hereafter, the expression "glass frit having a Littleton point above 700° C." will be called "refractory frit".

According to the invention, the water-soluble sodium silicate and/or potassium silicate represents from 20 to 40% by weight, preferably 20 to 30% by weight, of the enamel composition. The silicate may comprise only one sodium silicate or potassium silicate, or a mixture of several sodium silicates and/or potassium silicates. Preferably, the enamel composition does not contain potassium silicate.

Water represents from 5 to 25% by weight, preferably 10 to 20% by weight, of the composition.

The water-soluble base according to the present invention is used in a sufficient amount for the pH of the composition to be at least 10.5, preferably greater than 12.5 and even better greater than 13.5. To do this, any type of known water-soluble base, for example sodium hydroxide or potassium hydroxide, can be used. Sodium hydroxide is preferred. The highly basic nature makes it possible in particular to ensure that the composition is well preserved over time.

The metal oxide represents from 40 to 60% by weight, preferably 50 to 60% by weight, of the composition according to the invention. The metal oxide is chosen from the group consisting of copper oxides, iron oxides, cobalt oxides, mixtures of these oxides, and mixtures of chromium oxide(s) and at least one of said oxides, which give the enamel the desired black coloration. Preferably, the metal oxide is chosen from mixtures of chromium oxide(s) and copper and/or iron oxide(s).

In one advantageous embodiment, especially when the substrate to be coated is made of clear glass, the metal oxide is copper chromite ($Cr_2O_3 \cdot CuO$), iron chromite ($Cr_2O_3 \cdot FeO$) or a mixture of these chromites (preferably containing more than 50% by weight of copper chromite). Particularly preferably, the metal oxide consists entirely of copper chromite.

The metal oxide is in general in a finely divided form, the average particle size being less than 7 µm, preferably between 5 and 7 µm and advantageously less than 5 µm.

Zinc oxide represents less than 10% by weight, preferably 1 to 6% by weight and better still 4 to 6% by weight, of the composition according to the invention. The zinc oxide acts as a promoter of adhesion of the components of the composition to the glass. It has the effect of improving the compatibility of the enamel with the glass, especially by reducing the difference between the expansion coefficients of the enamel and the glass.

The low-melting-point frit represents at least 10%, preferably 10 to 30% and better still 10 to 25%, by weight of the composition according to the invention. As examples, mention may be made of bismuth-borosilicate glass frits, zinc-borosilicate glass frits and lead-borosilicate glass frits (even though the latter are not desirable, essentially for reasons associated with the presence of lead in the environment). The glass frit according to the invention may consist of a single frit or a mixture of several frits chosen from the aforementioned frits. Advantageously, especially when the frit content exceeds 20%, it is a bismuth-borosilicate or zinc-borosilicate glass frit containing nucleating seeds capable of making the frit crystallizable. The use of such a frit makes it possible in particular to improve the antistick properties of the enamel when bending pairs of glass panes for the purpose of forming laminated glazing, which makes it possible to avoid transfer of the enamel on that face of the glass facing the coating. Bismuth-borosilicate glass frits are preferred, especially because they offer greater resistance to chemical agents. In a preferred embodiment, especially for the production of laminated glazing, the melting point of the glass frit is below 600° C. and is advantageously between 500 and 600° C.

In the composition according to the invention, the refractory frit content is less than 10% by weight, preferably varies from 4 to 10% and better still is between 0 and 4%. In general and preferably, especially when it relates to laminated glazing, the composition does not contain a refractory frit. As examples, mention may be made of soda-lime glass frits, such as float glass. The refractory frit is generally in the form of particles whose average size is less than 20 µm, preferably varying from 3 to 15 µm and better still from 5 to 7 µm.

Apart from the aforementioned essential constituents, the composition according to the invention may contain a small amount (in general less than 1%, preferably less than 0.5%, by weight) of a surfactant acting as a wetting agent with respect to the glass.

The composition according to the invention may also contain ingredients for lowering the expansion coefficient, of the ceramic frit type with a low expansion coefficient, especially one based on zirconium or alumina (zirconium silicate or alumina silicate in proportions ranging from 5 to 25% and preferably from 10 to 20%.

The amount added depends on the base composition of the enamel, on the composition of the glass, on the profile of the edge of the glass, on the position of the enamel with respect to the edge of the glass and on the thickness of the enamel.

In particular, the addition is greater if the enamel is deposited right to the edge of the glass and if this edge is fashioned so as to be rounded, favoring therefore greater enamel thicknesses, of the order of 100 microns or more at the extremity of the glass. This is because, owing to the high expansion coefficient of this type of enamel, extension stresses are then generated in the glass, stresses which may be harmful.

Since the expansion-coefficient-lowering ingredients are infusible, their particle size is preferably chosen to be small, preferably less than 20 microns, so as not to impair the appearance of the enamel, particularly its roughness.

The composition according to the invention may be prepared by simple blending of the various constituents in an appropriate device, for example a ball mill, for a time long enough to obtain a homogeneous blend. The blending is generally carried out at room temperature (around 25 to 30° C.). However, it is preferred to use the method consisting in dissolving the sodium silicate, and where appropriate the potassium silicate, in water, preferably with vigorous stirring, and in adding the other constituents of the composition to said solution, the order of introduction not being critical.

The blend obtained is then deposited on a glass substrate. The glass used may belong to any type of glass normally used in the glazing field for automobiles or buildings, such as soda-lime glass (float glass).

To deposit the blend on the glass, any method known in the field in question may be used, for example screen printing, spraying, curtain coating or roll coating. When screen printing is used, this being the preferred method, it is recommended to keep the suitable device under controlled humidity conditions, advantageously in a relative humidity close to 80 to 85%, as described in U.S. Pat. No. 5,509,964.

The shape, size and number of the coatings on one or more faces of the glass substrate depend substantially on the use for which it is intended. In automobiles, at least one coating is generally applied around the perimeter of the glazing in the form of a band of variable width, but with a width, however, sufficient to mask the elements located beneath the glazing, these possibly being adhesives and/or connection elements, especially electrical connection elements, as indicated above.

The thickness of the coating can vary according to the envisioned use. In the case of the aforementioned band, the thickness varies in general from 15 to 35 µm and preferably from 20 to 28 µm.

Once the composition according to the invention has been coated onto it, the substrate is heated to a temperature high enough to eliminate the water and allow the coating to bond to the glass. This temperature is, however, below the softening temperature of the substrate, so as to prevent any deformation of the glass causing optical defects, the latter absolutely having to be avoided when producing automobile glazing, such as windshields. In general, the heating is carried out at a temperature below 500° C., and preferably 250° C. For this purpose, it is possible to use any known means, for example microwave or infrared radiation. When several layers are deposited on the substrate, each layer is preferably dried before the next layer is deposited. Preferably, the substrate comprises only a single enamel layer according to the invention.

The glass sheet coated with the enamel composition on at least one of its faces, preferably only a single face, is baked, the baking taking place, where appropriate, during the heat treatment associated with the bending and/or toughening of the substrate.

The glass substrate is bent using methods known per se at a baking temperature generally of around 560 to 640° C., preferably about 580–600° C. ("slight" bending) and 600–620° C. ("deep" bending), this temperature being reached after a time preferably not exceeding about ten minutes. The bending may be carried out by gravity, as is especially the case with glass substrates bent in pairs for the manufacture of laminated glazing, or by means of dies.

Toughening of the glass substrate, especially used for monolithic glazing, is carried out using methods known per se at a temperature generally of around 640 to 680° C. for a time not exceeding a few minutes. When the substrate is bent and toughened, the toughening may be carried out after the enameled substrate has been bent, possibly in the same device.

In one particularly advantageous embodiment, the substrate coated with the composition according to the invention is a clear glass sheet of variable thickness (generally from 1.6 to 2.6 mm, preferably from 2.1 to 2.6 mm) intended to form a laminated pane, especially for an automobile windshield. In this case, the glass sheet bearing the enamel coating is joined to at least one other glass sheet, and the sheets are bent. Preferably, the second glass sheet is not coated with enamel and the glass has the same composition as that of the first sheet. Advantageously, the thickness of the second glass sheet lies within the afore-mentioned limits, and better still is equal to that of the first sheet. It is particularly advantageous for the glass sheets during bending to be placed so that the face bearing the enamel composition constitutes the 2 face (the internal face of the external sheet) of the laminated glazing in its final position. The bent glass sheets are separated (separation being easier if there is no trace of bonding) so as to insert therebetween at least one insert film of different material, for example an organic material such as polyvinyl butyral, and then they are joined together using heat and pressure to form the laminated glazing.

The composition according to the invention is particularly suitable for coating an unenameled glass substrate or a glass substrate already coated with one or more enamel layers. This substrate may consist of one or more glass sheets and may be toughened so as to exhibit improved mechanical strength and thermal resistance properties. The substrate coated with the enamel according to the invention thus comprises at least one glass sheet coated over at least a portion of one of its faces with at least one layer of an enamel having the composition according to the invention.

The examples which follow allow the invention to be illustrated, without however limiting it.

In the examples, the melting point of the low-melting-point frit is determined by the method consisting in depositing the glass frit (15–30 µm thickness) on a glass sheet (length: 150 mm; width: 60 mm) and in heating according to a suitable temperature ramp having an amplitude of about 100° C. (in general, two temperature ramps suffice, one varying from 500 to 600° C., the other from 600 to 700° C.). After cooling to room temperature, a line is drawn with a felt pen on the vitrified layer obtained (from the region of the layer corresponding to the lowest temperature to that of the highest temperature), and, by looking through the substrate, the point at which a bright line (corresponding to the penetration of the solvent(s) into said layer) appears is determined. The temperature associated with the aforementioned point corresponds to the melting point of the frit.

The Littleton point of the refractory frit is determined under the conditions of the abovementioned ASTM C 338 standard.

EXAMPLE 1

A black enamel composition was prepared by blending, at room temperature and with stirring (at around 100 rpm), the following parts A and B (in percentages by weight):

| Part A: | |
|---|---|
| sodium silicate | 23 |
| water | 11 |
| sodium hydroxide in an amount sufficient to obtain a pH of 10.5; | |
| Part B: | |
| copper chromite | 52 |
| zinc oxide | 1 |
| bismuth-borosilicate glass frit (around 600° C. melting point) | 13 |

The enamel composition thus prepared was deposited on a clear glass sheet (PLANILUX®; thickness: 2.6 mm) by screen printing in a wet medium (coating thickness: 25 μm). The sheet coated with the composition was heated to 220° C. (time: 3 minutes). After cooling, a uniform scratch-resistant coating having an L* value of 18 was obtained.

The aforementioned glass sheet (large pane) was placed on a horizontal bending frame, the face coated with the enamel composition turned upward, and a second sheet 2.1 mm in thickness, of slightly smaller size (small pane), made of glass of the same type as the first but devoid of any enamel composition. The assembly was heated to about 610–620° C. (duration: 8–10 minutes) and then cooled to room temperature. The large pane was coated with a black enamel about 16 μm in thickness, having the following colorimetric coordinates: L*=5–6; a*≦0.5 and b*≦0.5 (these coordinates being measured at 20 points on the enamel layer).

EXAMPLE 2

A black enamel composition was prepared by blending, at room temperature and with stirring (at around 100 rpm), the following parts A and B (in percentages by weight):

| Part A: | |
|---|---|
| sodium silicate | 23 |
| water | 11 |
| sodium hydroxide in an amount sufficient to obtain a pH of 10.5; | |
| Part B: | |
| copper chromite | 41 |
| zinc oxide | 3 |
| bismuth-borosilicate glass frit (around 600° C. melting point) | 22 |

The enamel composition thus prepared was deposited on a clear glass sheet (PLANILUX®; thickness: 2.1 mm) by screen printing in a wet medium (coating thickness: 22 μm). The sheet coated with the composition was heated to 220° C. (time: 3 minutes). After cooling, a uniform scratch-resistant coating having an L* value of 15 was obtained.

The aforementioned glass sheet (large pane) was placed on a horizontal bending frame, the face coated with the enamel composition turned upward, and a second sheet 2.1 mm in thickness, of slightly smaller size (small pane), made of glass of the same type as the first but devoid of any enamel composition. The assembly was heated to about 580–600° C. (duration: 8–10 minutes) and then cooled to room temperature. The large pane was coated with a black enamel about 16 μm in thickness, having the following calorimetric coordinates (measured under the conditions of Example 1): L*=5–6; a*≦0.5 and b*≦0.5.

COMPARATIVE EXAMPLE

This example was produced under the conditions of Example 1, but modified in that, on the one hand, the enamel composition was different and, on the other hand, the thickness of the layer deposited by screen printing was 24 μm.

The composition contained (in percentages by weight):

| Part A: | |
|---|---|
| sodium silicate | 25 |
| water | 15 |
| sodium hydroxide in an amount sufficient to obtain a pH of 10.5; | |
| Part B: | |
| copper oxide | 25 |
| bismuth-borosilicate glass frit (around 680° C. melting point) | 5 |
| soda-lime float glass frit (around 730° C. Littleton point) | 30 |

After bending, the large pane was coated with a gray enamel, having a yellowish tendency, with the following calorimetric coordinates (measured under the conditions of Example 1): L*=15; a*=0.8 and b*=1.7.

In the examples according to the invention, the enameled glass sheets obtained after the bending step were easily separated (no sticking point). Moreover, it was found that the enamel heated via the large pane face (the 2 face of the glazing in the final position) was uniformly distributed over the surface of the glass and also that the small pane face (the 3 face) in contact with the large pane contained no trace of enamel.

The invention claimed is:

1. A water-based black enamel composition, comprising:
    20 to 40% by weight of a member selected from the group consisting of water-soluble sodium silicate, potassium silicate and mixtures thereof;
    a water-soluble base, in an amount sufficient for the pH of the composition to be at least 10.5;
    5 to 25% by weight of water;
    40 to 60% by weight of a metal oxide selected from the group consisting of mixtures of chromium oxide(s) and at least one oxide selected from the group consisting of copper oxides, iron oxides and cobalt oxides;
    less than 10% by weight of zinc oxide;
    at least 10% by weight of a glass frit having a melting point below 680° C.; and
    less than 10% by weight of a glass frit having a Littleton point above 700° C.;
    wherein said composition is capable of being deposited on a glass substrate.

2. The composition as claimed in claim 1, wherein the metal oxide is copper chromite, iron chromite or a mixture thereof.

3. The composition as claimed in claim 1, wherein the metal oxide consists entirely of copper chromite.

4. The composition as claimed in claim 1, comprising 50 to 60% by weight of metal oxide.

5. The composition as claimed in claim 1, comprising 10 to 30% by weight of glass fit having a melting point below 680° C.

6. The composition as claimed in claim 1, comprising 20 to 30% by weight of a member selected from the group consisting of water-soluble sodium silicate, potassium silicate and mixtures thereof.

7. The composition as claimed in claim 1, comprising from 10 to 20% by weight of water.

8. The composition as claimed in claim 1, comprising 1 to 6% by weight of zinc oxide.

9. The composition as claimed in claim 1, comprising 4 to 10% by weight of glass fit having a Littleton point above 700° C.

10. The composition as claimed in claim 1, wherein the melting point of the glass frit is below 600° C.

11. The composition as claimed in claim 10, wherein the melting point of the glass frit is between 500 and 600° C.

12. The composition as claimed in claim 1, wherein the frit having a melting point below 680° C. is a bismuth-borosilicate glass frit, a zinc-borosilicate glass frit, a lead-borosilicate glass frit or a mixture of said frits.

13. The composition as claimed in claim 1, comprising ingredients for lowering the expansion coefficient selected from the group consisting of zirconium silicate and aluminum silicate.

14. The composition as claimed in claim 13, wherein the ingredients for lowering the expansion coefficient are added in proportions from 5 to 25%.

15. The composition as claimed in claim 13, wherein the ingredients for lowering the expansion coefficient are added in proportions from 10 to 20% by weight.

16. A glass sheet, comprising:
at least one face which is at least partially coated with the enamel composition as claimed in claim 1.

17. The glass sheet as claimed in claim 16, comprising ingredients for lowering the expansion coefficient selected from the group consisting of zirconium silicate and aluminum silicate, said composition being deposited right to the edge.

18. A laminated glazing, comprising:
at least two glass sheets separated by at least one sheet of organic material,
wherein at least one glass sheet is coated at least partially on at least one of its faces with the enamel composition as claimed in claim 1.

19. The composition as claimed in claim 1, comprising said glass frit having a Littleton point above 700° C.

20. A water-based black enamel composition, comprising:
20 to 40% by weight of a member selected from the group consisting of water-soluble sodium silicate, potassium silicate and mixtures thereof;
a water-soluble base, in an amount sufficient for the pH of the composition to be at least 10.5;
5 to 25% by weight of water;
40 to 60% by weight of a metal oxide selected from the group consisting of copper oxides, iron oxides, cobalt oxides, mixtures of these oxides and mixtures of at least one of said oxides with chromium oxide(s);
less than 10% by weight of zinc oxide;
at least 10% by weight of a glass frit having a melting point below 680° C.; and
less than 10% by weight, but not 0% by weight, of a glass frit having a Littleton point above 700° C.;
wherein said composition is capable of being deposited on a glass substrate.

21. The composition as claimed in claim 20, wherein the metal oxide is a mixture of at least two members selected from the group consisting of chromium oxide(s), copper oxide(s) and iron oxide(s).

22. The composition as claimed in claim 21, wherein the metal oxide is copper chromite, iron chromite or a mixture thereof.

23. The composition as claimed in claim 20, wherein the metal oxide consists entirely of copper chromite.

24. The composition as claimed in claim 20, comprising 50 to 60% by weight of metal oxide.

25. The composition as claimed in claim 20, comprising 10 to 30% by weight of glass frit having a melting point below 680° C.

26. The composition as claimed in claim 20, comprising 20 to 30% by weight of a member selected from the group consisting of water-soluble sodium silicate, potassium silicate and mixtures thereof.

27. The composition as claimed in claim 20, comprising from 10 to 20% by weight of water.

28. The composition as claimed in claim 20, comprising 1 to 6% by weight of zinc oxide.

29. The composition as claimed in claim 20, comprising 4 to 10% by weight of glass frit having a Littleton point above 700° C.

30. The composition as claimed in claim 20, wherein the melting point of the glass frit is below 600° C.

31. The composition as claimed in claim 30, wherein the melting point of the glass frit is between 500 and 600° C.

32. The composition as claimed in claim 20, wherein the frit having a melting point below 680° C. is a bismuth-borosilicate glass frit, a zinc-borosilicate glass frit, a lead-borosilicate glass frit or a mixture of said frits.

33. The composition as claimed in claim 20, comprising ingredients for lowering the expansion coefficient selected from the group consisting of zirconium silicate and aluminum silicate.

34. The composition as claimed in claim 33, wherein the ingredients for lowering the expansion coefficient are added in proportions from 5 to 25%.

35. A glass sheet, comprising: at least one face which is at least partially coated with the enamel composition as claimed in claim 20.

36. The glass sheet as claimed in claim 35, comprising ingredients for lowering the expansion coefficient selected from the group consisting of zirconium silicate and aluminum silicate, said composition being deposited right to the edge.

37. A laminated glazing, comprising:
at least two glass sheets separated by at least one sheet of organic material,
wherein at least one glass sheet is coated at least partially on at least one of its faces with the enamel composition as claimed in claim 20.

38. The composition as claimed in claim 33, wherein the ingredients for lowering the expansion coefficient are added in proportions from 10 to 20% by weight.

* * * * *